United States Patent
Oda et al.

(10) Patent No.: US 7,715,882 B2
(45) Date of Patent: May 11, 2010

(54) MOBILE TERMINAL APPARATUS, CHARACTER INPUT METHOD AND CHARACTER INPUT PROGRAM

(75) Inventors: Shoichiro Oda, Yokohama (JP); Satoshi Azuma, Tokyo (JP)

(73) Assignee: Kyocera Corporation, Kyoto (JP)

( * ) Notice: Subject to any disclaimer, the term of this patent is extended or adjusted under 35 U.S.C. 154(b) by 810 days.

(21) Appl. No.: 11/338,326

(22) Filed: Jan. 24, 2006

(65) Prior Publication Data

US 2006/0164398 A1   Jul. 27, 2006

(30) Foreign Application Priority Data

Jan. 25, 2005   (JP) .............................. 2005-017305

(51) Int. Cl.
  *H04M 1/00* (2006.01)
(52) U.S. Cl. .................... 455/566; 455/466; 455/414.1; 455/414.4; 341/22; 341/23; 341/28; 341/29; 341/30; 379/368; 379/370; 704/2; 704/3; 704/4; 704/5; 704/6; 345/168; 345/169; 345/171; 345/172
(58) Field of Classification Search ................. 455/466, 455/566, 550.1, 414.1, 414.4; 345/168, 169, 345/171, 172; 341/22, 23, 28, 29, 30, 178, 341/179, 182, 183, 184; 379/368, 369, 370; 704/2, 3, 4, 5, 6, 8, 9
See application file for complete search history.

(56) References Cited

U.S. PATENT DOCUMENTS

| | | | |
|---|---|---|---|
| 6,043,760 A * | 3/2000 | Laakkonen | 341/22 |
| 6,340,937 B1 * | 1/2002 | Stepita-Klauco | 341/23 |
| 6,378,234 B1 * | 4/2002 | Luo | 341/22 |
| 6,542,170 B1 | 4/2003 | Williams et al. | |
| 6,674,372 B1 * | 1/2004 | Ouyang | 341/28 |
| 6,868,280 B2 * | 3/2005 | Savolainen et al. | 455/550.1 |

(Continued)

FOREIGN PATENT DOCUMENTS

CN   1269685 A   10/2000

(Continued)

OTHER PUBLICATIONS

Chinese language office action and its English translation for corresponding Chinese application No. 200610006993.9.

(Continued)

*Primary Examiner*—Charles N Appiah
*Assistant Examiner*—Olumide T Ajibade Akonai
(74) *Attorney, Agent, or Firm*—Hogan & Hartson LLP (57) ABSTRACT

A mobile terminal apparatus requests a character be displayed which is assigned to a first key upon being pushed, and if operated continuously for a time span that exceeds a predetermined time, requests a next character be displayed which is assigned to the first key instead of the character assigned to the first key and currently being displayed, if the time span exceeds the predetermined time and the character assigned to the first key and currently being displayed is a special character that has another variation, changes the character to a character of the another variation, and, when the time span exceeds the predetermined time and the character assigned to the first key and currently being displayed is not a special character, requests a new character be displayed right next to the character which is currently being displayed.

16 Claims, 5 Drawing Sheets

U.S. PATENT DOCUMENTS

| | | | |
|---|---|---|---|
| 6,975,304 B1 * | 12/2005 | Hawkins et al. | 345/168 |
| 7,389,124 B2 * | 6/2008 | Fux et al. | 455/550.1 |
| 2002/0123367 A1 | 9/2002 | Savolainen et al. | |
| 2002/0135579 A1 | 9/2002 | You | |
| 2004/0127236 A1 * | 7/2004 | Chatterjee | 455/466 |
| 2004/0252035 A1 * | 12/2004 | Chang | 341/28 |

FOREIGN PATENT DOCUMENTS

| | | |
|---|---|---|
| EP | 1237068 A2 | 9/2002 |
| EP | 1417824 A | 5/2004 |
| JP | 2000286935 A | 10/2000 |
| JP | 2002-290510 A | 10/2002 |
| JP | 2003099180 A | 4/2003 |
| JP | 2003-264620 A | 9/2003 |
| JP | 2004-030442 | 1/2004 |

OTHER PUBLICATIONS

Japanese language office action and its English translation for corresponding Japanese Application No. 2005-017305 lists the references above.

Chinese language application and its English language translation for corresponding Chinese application 200610006993.9 lists the references above.

* cited by examiner

| KEY | CHARACTERS WHICH ARE ASSIGNED (THE FIRST PHASE) | CHARACTERS WHICH ARE ASSIGNED (THE SECOND PHASE) |
|---|---|---|
| [1] | [SP] . , - ( ) : ; 1 | |
| [2] | A Ă Â B C 2 | A Á À Ả Ã Ạ |
| | | Ă Ắ Ằ Ẳ Ẵ Ặ |
| | | Â Ấ Ầ Ẩ Ẫ Ậ |
| [3] | D Đ E Ê F 3 | E É È Ẻ Ẽ Ẹ |
| | | Ê Ế Ề Ể Ễ Ệ |
| [4] | G H I 4 | I Í Ì Ỉ Ĩ Ị |
| [5] | J K L 5 | |
| [6] | M N O Ô Ơ 6 | O Ó Ò Ỏ Õ Ọ |
| | | Ô Ố Ồ Ổ Ỗ Ộ |
| | | Ơ Ớ Ờ Ở Ỡ Ợ |
| [7] | P Q R S 7 | |
| [8] | T U Ư V 8 | U Ú Ù Ủ Ũ Ụ |
| | | Ư Ứ Ừ Ử Ữ Ự |
| [9] | W X Y Z 9 | Y Ý Ỳ Ỷ Ỹ Ỵ |
| [0] | 0 | |

FIG. 5

MOBILE TERMINAL APPARATUS, CHARACTER INPUT METHOD AND CHARACTER INPUT PROGRAM

BACKGROUND OF THE INVENTION

1. Field of the Invention

The present invention relates to a mobile terminal apparatus, character input method and character input program for character input using a key operation.

Priority is claimed on Japanese Patent Application No. 2005-17305, filed Jan. 25, 2005, the content of which is incorporated herein by reference.

2. Description of Related Art

In a mobile terminal apparatus which provides a mailing function, in order to accept character inputs such as sentences in a mail, predetermined alphabetic characters are assigned to dialing keys (ten keys from "0" to "9"), and character inputs are made by selecting the desired dialing keys. For example, when inputting Japanese, characters included in the "a" column, "ka" column, . . . , "ra" column and "wa, wo, n" are assigned to each of the above ten key buttons, and it is determined that "i" is input when the key assigned to the "a" column is pushed twice and "u" is input when the key assigned to the "a" column is pushed three times. It becomes possible to send mails easily from outside by operating the dialing keys of the mobile terminal apparatus having such a function.

Moreover, dull sounds and "pa", "pi", "pu", "pe" and "po" are often used, and a character input apparatus which simplifies the method to input such characters is known (for example, see Japanese Unexamined Patent Application, First Publication No. 2004-030442).

Figure 5:
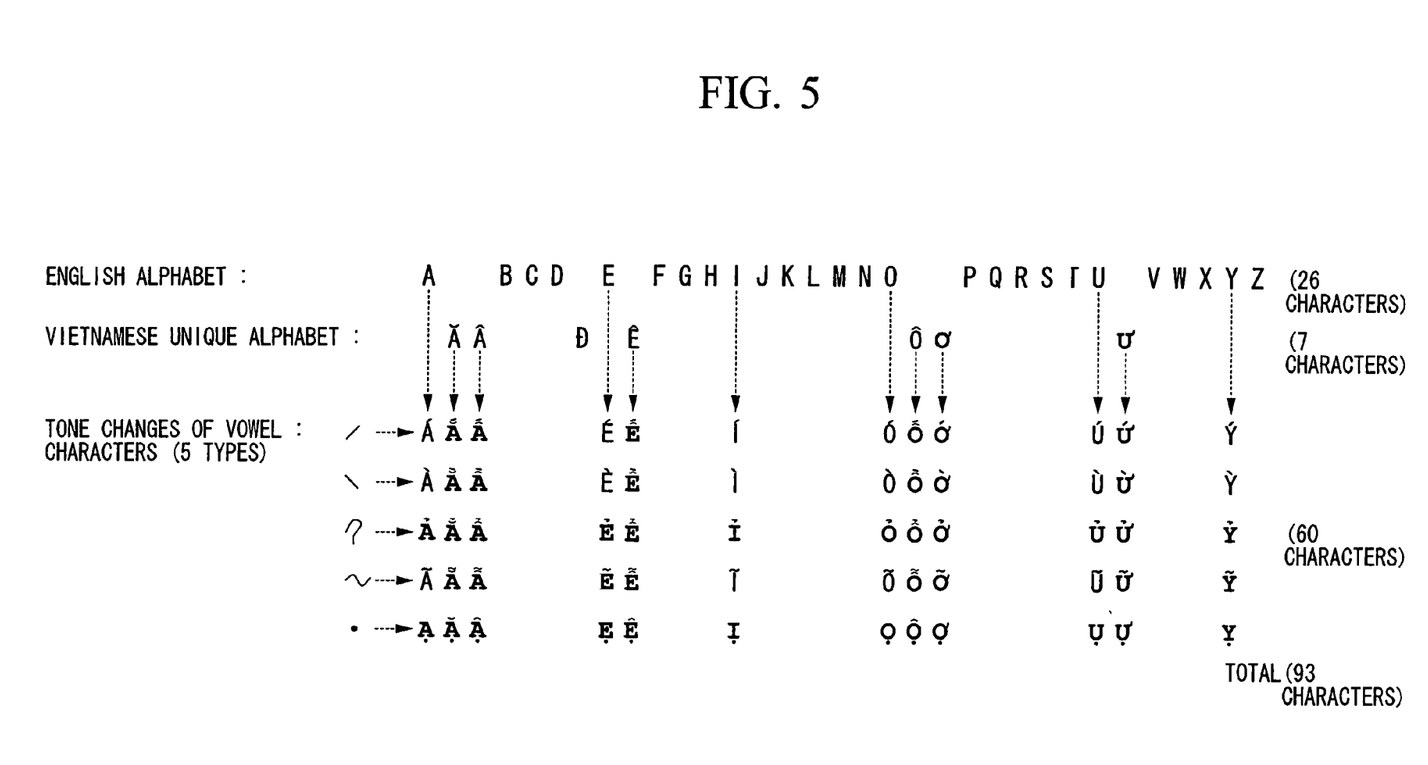
FIG. 5 is a descriptive figure showing types of characters.

However, a language which uses characters that have tone signs, for example Vietnamese, has many alphabetic characters. For example, in Vietnamese, as shown in FIG. 5, as well as the 26 characters of the English alphabets, there are 6 vowel characters and one consonant character which are unique to Vietnamese (therefore, Vietnamese has unique 7 alphabetic characters), and each of 12 kinds of vowel characters have combination characters to which 5 different kinds of tone signs are appended, therefore, the total number of characters which are used is 93. The number of characters which are assigned to one key becomes large when these characters are assigned to ten dialing keys (ten key), therefore, there is a problem in that the numbers of a key needs to be pushed in order to select one character from the characters assigned to a key increases according to the number of characters assigned to the key. Moreover, it is difficult to print characters assigned to the key on the key face when a large number of characters are assigned to one key; therefore, there is also a problem in that the operation of inputting characters becomes complex since a user needs to refer to a manual or the like to detect which key to push to select a desired character.

The present invention has been made in order to solve the problems above, and an object thereof is to provide a mobile terminal apparatus, character input method and character input program which allows easy input of characters by a key operation.

SUMMARY OF THE INVENTION

A first aspect of the present invention is a mobile terminal apparatus which displays characters on a display unit including: multiple keys to each of which multiple characters are assigned; and a control unit which operates to request the display unit to display a character corresponding to one of the multiple keys which is operated, wherein the control unit operates in a manner in which the control unit when a first key is pushed as first operation, requests a character be displayed which is assigned to the first key, when the same key as the first key is continuously operated as second operation from the first operation in predetermined time, requests a next character be displayed which is assigned to the first key instead of the character which is currently being displayed, when a time span between the first and the second operation exceeds the predetermined time and the currently displayed character is a special character that has a variation, requests that the displayed character be changed to the variation, and when the time span exceeds the predetermined time and the currently displayed character is not the special character, requests a new character be displayed next to the currently displayed character.

A second aspect of the present invention is a mobile terminal apparatus according to the first aspect, wherein the control unit, when a second key is operated continuously after the first operation, requests a character be displayed which is assigned to the second key next to the currently displayed character.

A third aspect of the present invention is a mobile terminal apparatus according to the first aspect, wherein a character of the variation is a character which consists of the special character and one of a tone sign, a dull sound mark, and a spelling mark.

A fourth aspect of the present invention is a mobile terminal apparatus according to the first aspect, wherein the special character is included in vowel characters of phonograms.

A first aspect of the present invention is a mobile terminal apparatus according to the fourth aspect, wherein the vowel characters include a derived vowel character which is a vowel character to which a sign is appended, and a character of the variation is the derived vowel character.

A first aspect of the present invention is a mobile terminal apparatus according to the fifth aspect, wherein when the first character is the vowel character and has the derived vowel character, the vowel character and the derived vowel character are assigned to the same first key.

A seventh aspect of the present invention is a mobile terminal apparatus according to the first aspect, wherein the predetermined time is variable.

An eighth aspect of the present invention is a character input method for a mobile terminal apparatus which displays characters on a display unit, which includes a multiple keys to each of which a multiple characters are assigned, and which operates to request the display unit to display a character corresponding to one of the multiple keys which is operated, the character input method including; displaying a character which is assigned to a first key when the first key is pushed as first operation, displaying a next character which is assigned to the first key instead of the character which is currently being displayed when the same key as the first key is continuously operated as second operation from the first operation in predetermined time, changing the displayed character to a variation when a time span between the first and the second operation exceeds the predetermined time and the currently displayed character is a special character that has the variation, and displaying a new character next to the currently displayed character when the time span exceeds the predetermined time and the currently displayed character is not the special character.

A ninth aspect of the present invention is a character input method for a mobile terminal apparatus according to the eighth aspect, wherein displaying a new character which is assigned to a second key next to the currently displayed character when the second key is operated continuously after the first operation.

A tenth aspect of the present invention is a character input method for a mobile terminal apparatus according to the eighth aspect, wherein a character of the another variation is a character which consists of the special character and one of a tone sign, a dull sound mark, and a spelling mark.

An eleventh aspect of the present invention is a character input method for a mobile terminal apparatus according to the eighth aspect, wherein the special character is included in vowel characters of phonograms.

A twelfth aspect of the present invention is a character input method for a mobile terminal apparatus according to the eleventh aspect, wherein the vowel characters include a derived vowel character which is a vowel character to which a sign is appended, and a character of the variation is the derived vowel character.

A thirteenth aspect of the present invention is a character input method for a mobile terminal apparatus according to the twelfth aspect, wherein when the first character is the vowel character and has the derived vowel character, the vowel character and the derived vowel character are assigned to the same first key.

A fourteenth aspect of the present invention is a character input method for a mobile terminal apparatus according to the eighth aspect, wherein the predetermined time is variable.

A fifteenth aspect of the present invention is a character input program in a computer readable medium of a computer included in a mobile terminal apparatus which displays characters on a display unit and includes a plurality of keys to each of which a plurality of characters are assigned, and which operates to request the display unit to display a character corresponding to one of the plurality of keys which is operated, including: first instructions for, when a first key is pushed as a first operation, displaying a character which is assigned to the first key, second instructions for, when the same key as the first key is continuously operated as second operation from the first operation in predetermined time, displaying a next character which is assigned to the first key instead of the character which is currently being displayed, third instructions for, when a time span between the first and the second operation exceeds the predetermined time and the currently displayed character is a special character that has another variation, changing the displayed character to the variation, and fourth instructions for, when the time span exceeds the predetermined time and the currently displayed character is not the special character, displaying a new character next to the currently displayed character.

DETAILED DESCRIPTION OF THE INVENTION

Figure 1:
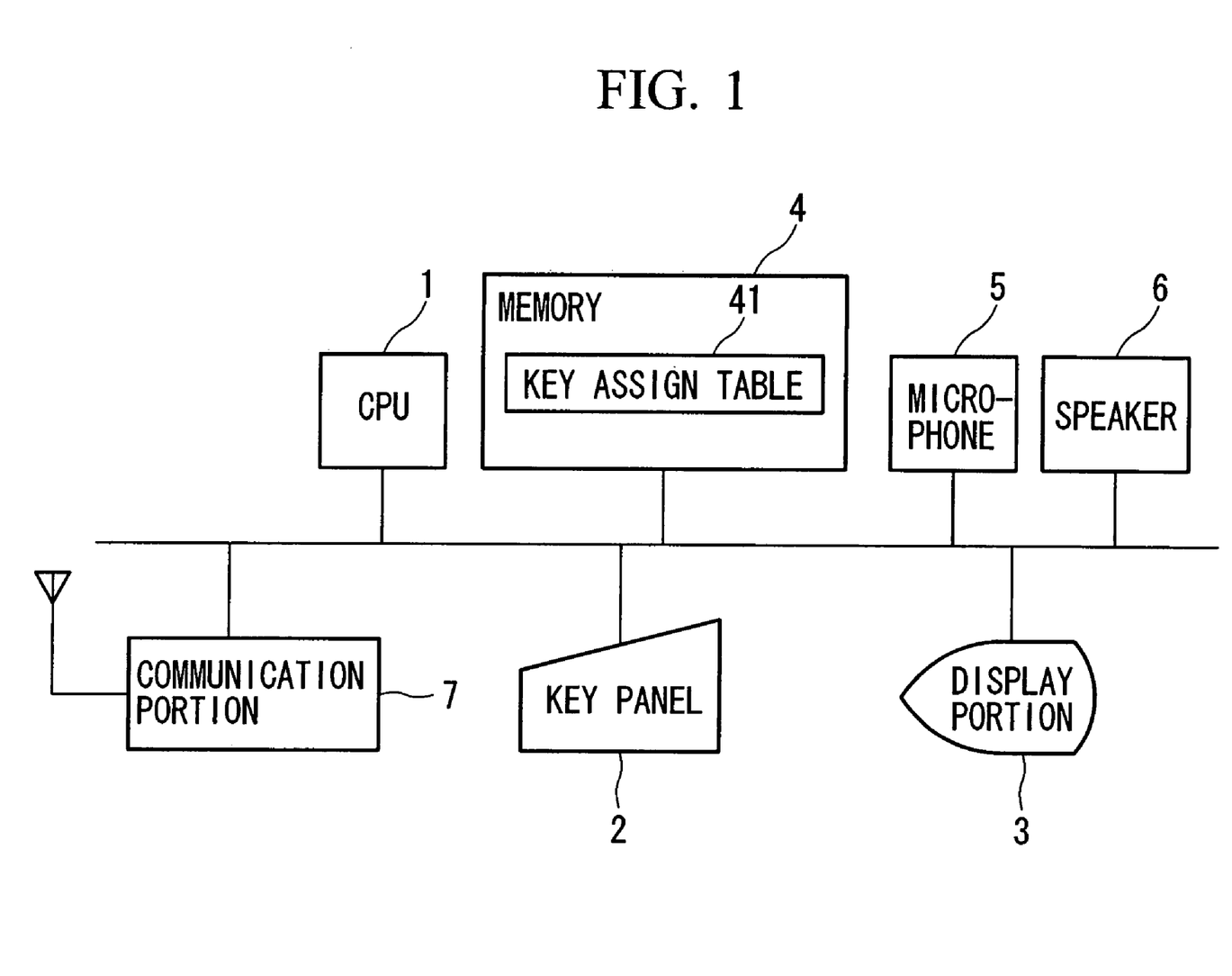
FIG. 1 is a block diagram showing one embodiment of the present invention.

Hereafter, a mobile terminal apparatus according to one embodiment of the present invention will be explained with reference to figures. FIG. 1 is a block diagram which shows the structure of the embodiment. In this figure, reference numeral 1 indicates a CPU which controls the overall processing of the mobile terminal apparatus. Reference numeral 2 indicates a key panel on which ten dialing keys as well as function keys are arranged. Reference numeral 3 indicates a display portion composed of a liquid crystal display and so on. Reference numeral 4 indicates a memory which stores programs and so on for operation of the mobile terminal apparatus, and which stores a key assign table 41 that defines characters corresponding to key buttons. Reference numeral 5 indicates a microphone which receives the voice of the user. Reference numeral 6 indicates a speaker which outputs the voice of a person who the user is communicating with. Reference numeral 7 indicates a communication portion which communicates with base stations via a wireless network.

Figure 3:
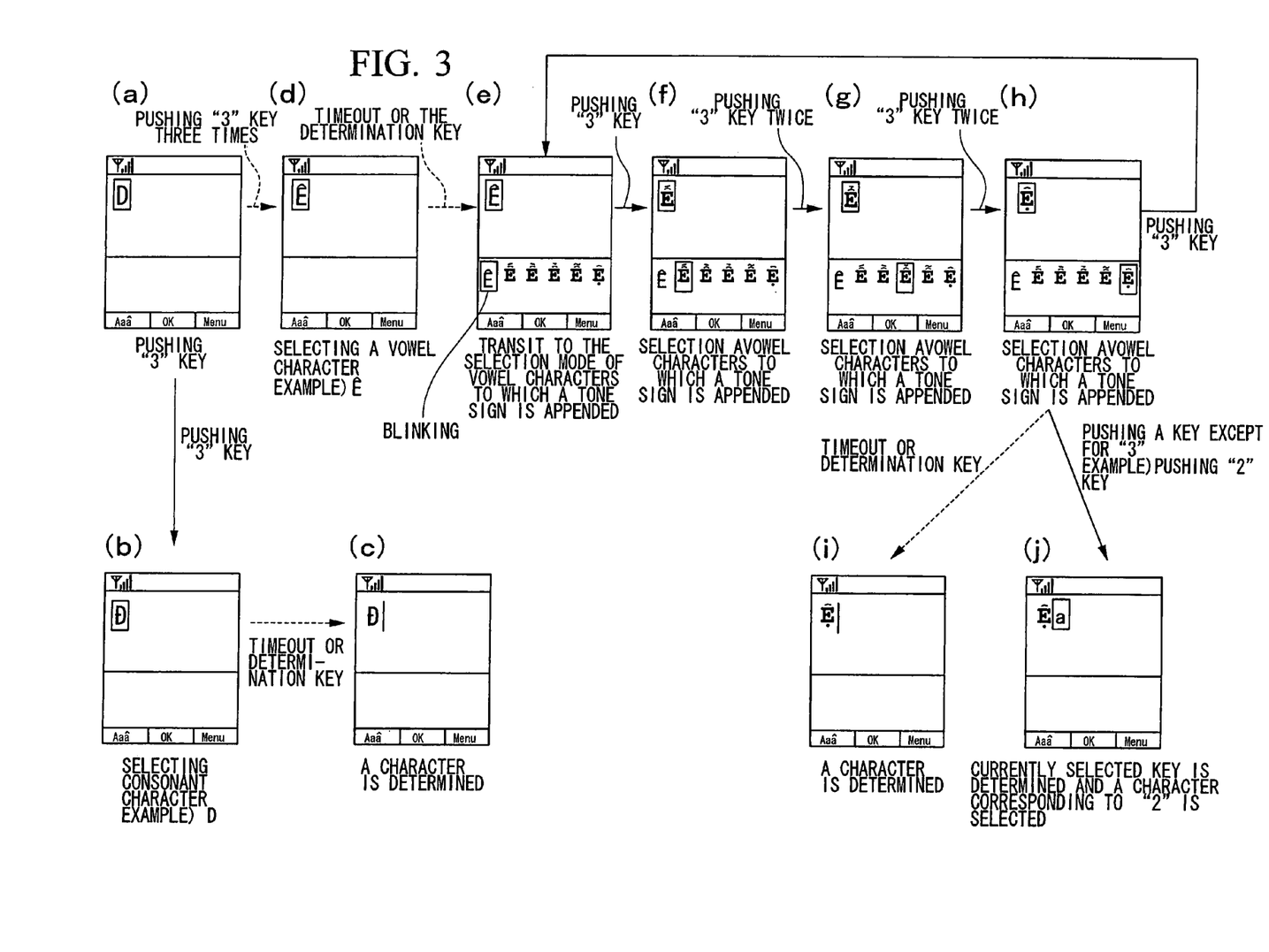
FIG. 3 is a descriptive figure showing a display transition of the display portion during character input.
Figure 4:
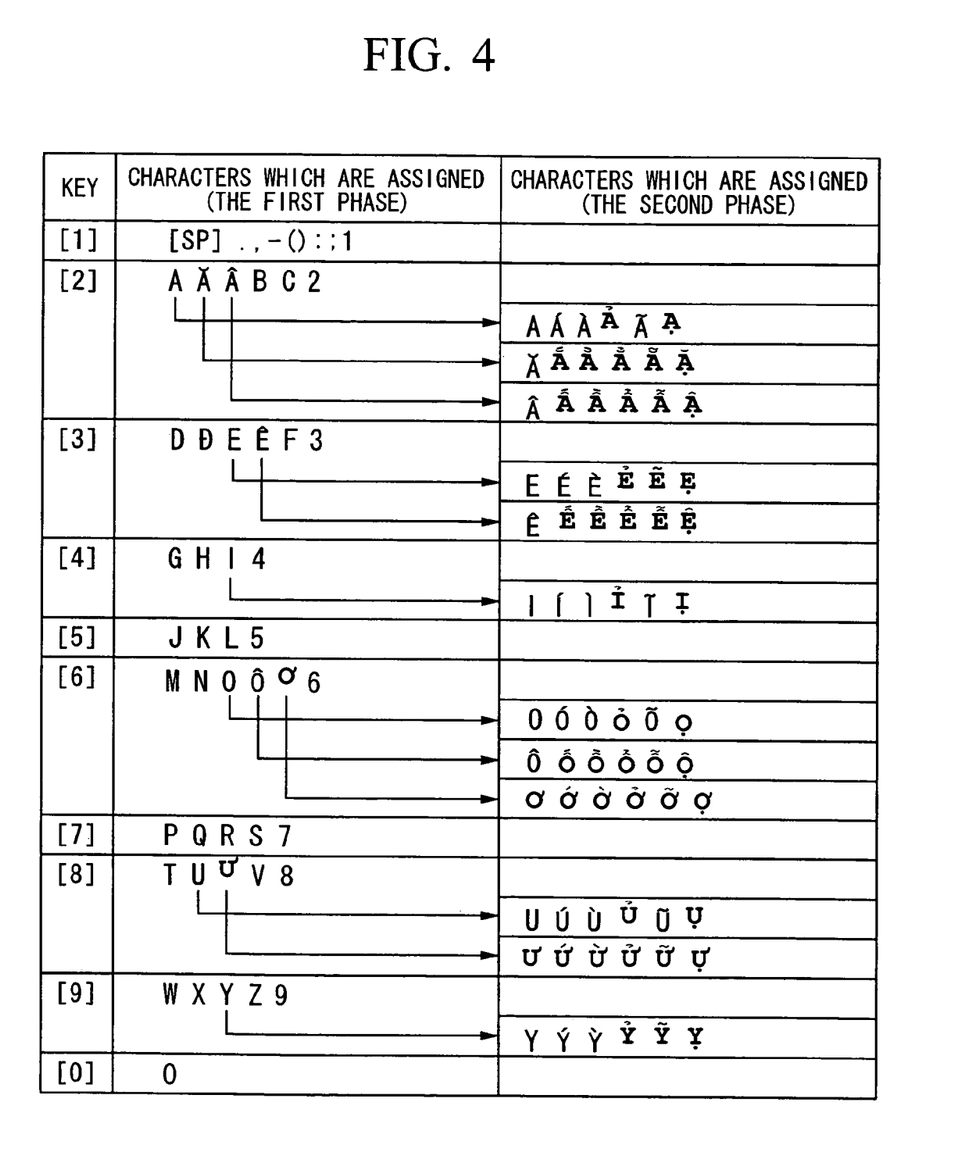
FIG. 4 is a descriptive figure showing a table structure of the key assign table shown in the FIG. 1.

The structure of the key assign table 41 in FIG. 1 will be explained with reference to FIG. 4. The key assign table 41 in FIG. 4 shows an example in which characters that are used in Vietnamese are assigned in advance to each of ten dialing keys ("1" to "9" and "0"). Function keys, such as a determination key (decision key), are provided in addition to ten dialing keys. In FIG. 3, assigned characters for the first phase are characters shown on the key buttons of ten dialing keys which are arranged on the key panel 2. Characters for the second phase (derived vowel characters) that are vowel characters of the first phase (12 characters) to which 5 kinds of tone signs are appended. Characters for the second phase are constructed from a total of 6 characters which make up 12 kinds of vowel characters and their derived characters, that is, the vowel characters to which 5 kinds of tone signs are appended. Characters to which tone signs (for example, B and C) are not appended are not defined in the second phase. Characters themselves are shown in the example of FIG. 4, however, the key assign table 41 is constructed from key codes and character font data in practice. The assign table is constructed so as to indicate the correspondence of characters of the second phase by appending predetermined signs (tone signs) to the basic characters of the first phase (vowel characters), therefore, correspondence becomes easy for users and it is possible to find which character corresponds to a desired character easily.

Next, processing of the CPU 1 when characters are input is explained with reference to FIG. 2. First, the CPU 1, when a request is made to input message sentences, edit items of names in a telephone directory, or the like in a situation such as sending messages using electronic mail or short message service (SMS), the CPU 1 changes to character input mode, senses conditions of the key panel 2, and detects the key which the user has pushed (step S1). The CPU 1 checks whether or not the key which is detected is a key to which some characters are assigned to (step S2). If the key which was pushed is a key to which some characters are assigned to (one of "0" to "9"), the CPU 1 checks whether or not the key is the same key as that pushed just before (the same key is pushed repeatedly: the second operation) (step S3). If the key is not the same key as that pushed just before (or the key which was pushed as a first character: the first operation), then, the CPU 1 checks whether or not there is an indeterminate character (step S4). If there is not an indeterminate character, a new character (corresponding to the key which is newly pushed) is read from the key assign table 41 and displayed next to the determined character on the display portion 3 (step S5). If there is an indeterminate character, a new character is read form the key assign table 41 and displayed next to determined character (step S5) after determining the character (step S6). An indeterminate character is determined if a different key from the key which was pushed just previously is pushed, therefore, an operation step of pushing the determination key or waiting for a timeout can be omitted.

On the other hand, if the same key as the key which was pushed just previously is pushed, the CPU 1 refers to the key assign table 41 and changes from a character which is displayed as an indeterminate character to a next candidate character on the display portion 3 (step S7). The CPU 1 checks whether or not the timeout has occurred by checking whether or not a new key has been pushed during a certain time period after a key was previously pushed (step S8). If the timeout has not occurred, the CPU 1 goes back to step S1 and repeats the processes.

If the key which is detected in step S2 is not a key to which characters are assigned, the CPU 1 checks whether or not the detected key is the determination key (step S9), and when the key is not the determination key, the process (for example, "back", "delete" and so on) which is assigned to the key which is pushed is carried out (step S10) and the process goes back to step S1.

When the timeout has occurred in step S8, the CPU 1 checks whether or not the newly pushed key is a vowel character (characters of the second phase are defined) referring to the key assign table 41 (step S11). If it is not a vowel character (characters of the second phase are defined), the CPU 1 determines the character which is assigned to the key that is pushed as an input character (step S12) and goes back to step S1.

On the other hand, in step S11, when it is a vowel character, the CPU 1 reads an assigned character of the second phase from the key assign table 41 which corresponds to the key that has been pushed and displays it (step S13). At this time, the character which is displayed may be a total of six characters that include vowel characters that are selected in the first phase and characters of these vowel characters to which signs are appended, and the first character (selected vowel character) blinks. Then the CPU 1 determines whether or not the timeout has occurred according to whether or not the time after displaying an assigned character of the second phase has exceeded a predetermined time span (step S14). If a timeout is detected based on the determination, a currently blinking character is determined as an input character (step S12).

At step S14, if a key is pushed before the timeout, the CPU 1 identifies the pushed key (step S15). Then, the CPU 1 determines whether or not the pushed key is the same key as the key to which a character is assigned that has been pushed just before (step S16). According to the determination, if the key is the same key as that has been pushed just before, then the CPU 1 blinks the next character to the currently blinking character as a candidate of an input character (step S17) and goes back to step S14.

On the other hand, in step S16, if it is not a key to which a character is assigned that has been pushed just before, then, the CPU 1 determines which key is the key that is selected (step S18). According to the determination, if the key which has been pushed is the determination key, then a character which is currently blinking is determined as an input character (step S12). Or, if the key which was detected is a key for assignment of other characters, then a character which is assigned to a newly pushed key is displayed (step S5), and after that an indeterminate character which is currently blinking is determined as an input character (step S6). Or, if the key which has been pushed is not the determination key or other keys to which characters are assigned, then a procedure which is assigned to the newly pushed key is carried out (step S10).

If the key which is pushed in step S9 is the determination key from the determination, the CPU 1 determines whether or not there is an indeterminate character at this step (step S19). From this determination, if there is an indeterminate character, a character which is blinking currently is determined as an input character (step S12). On the other hand, if there is not an indeterminate character, it is assumed that character input is finished at the end of a character string which is determined as having been input and the input mode of characters is finished (step S20).

Figure 2:
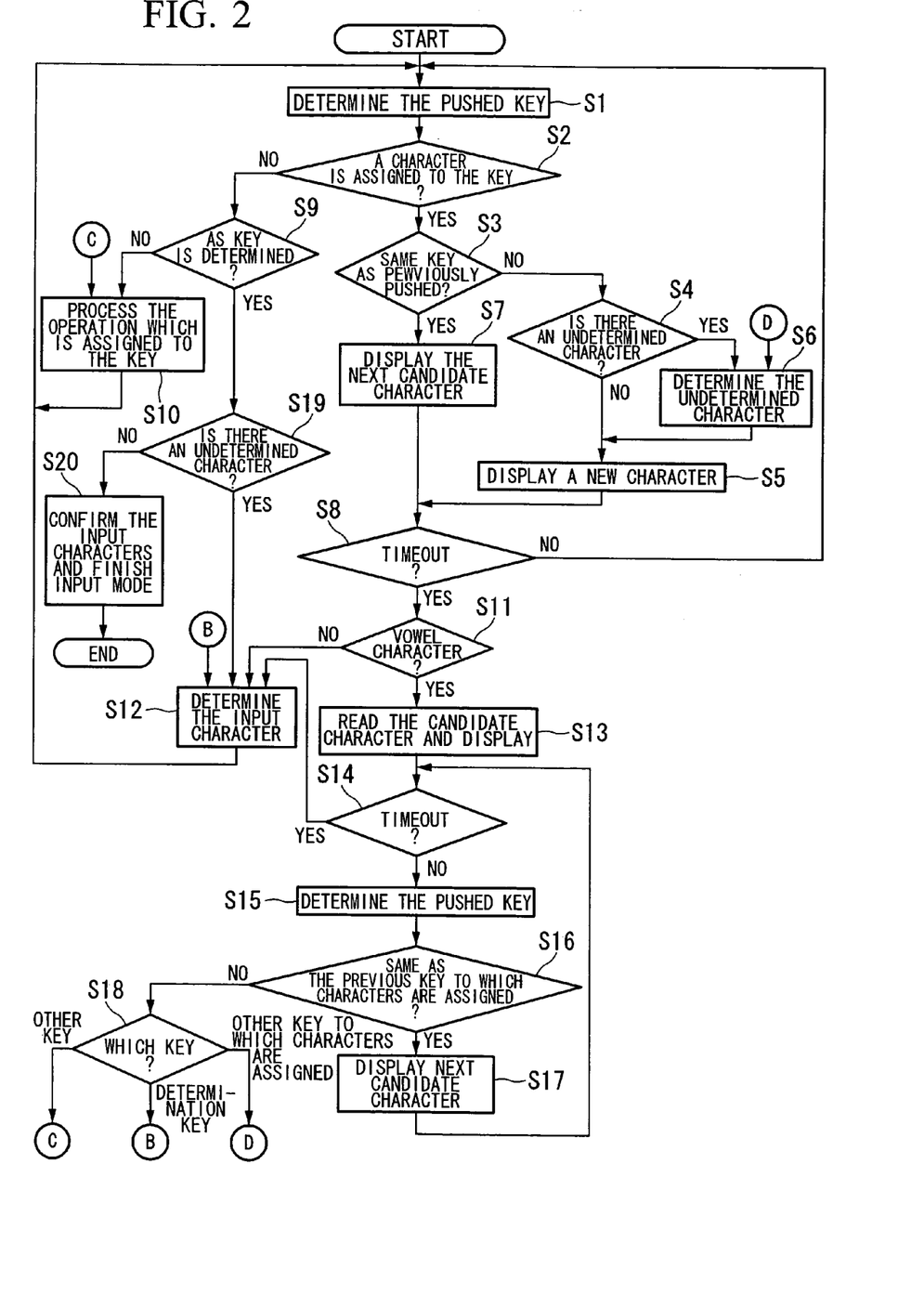
FIG. 2 is a flowchart showing a process of the apparatus of FIG. 1.

Next, referring to FIG. 3, a concrete example of the operation which is shown in FIG. 2 is explained. First, when "3" is pushed, the first character which is assigned to "3" at the first phase is displayed on a cursor (expressed as a blinking box frame) (FIG. 3, part (a)) on the display portion 3. If "3" is pushed during a predetermined time period continuously, without moving the cursor, the second character assigned to "3" is displayed on the display portion 3 (FIG. 3, part (b)). If the timeout occurs or the determination key is pushed in this situation, the character on the cursor is determined as an input (FIG. 3, part (c)).

On the other hand, after pushing the "3" key (FIG. 3, part (a)), if the "3" key is pushed three times ("3" key is pushed a total of 4 times), the fourth character which is assigned to the "3" key in the first phase is displayed on the cursor of the display portion 3 (FIG. 3, part (d)). If the timeout occurs or the determination key is pushed in this situation, after moving to a selection mode from vowel characters to which tone signs are appended, assigned characters at the second phase (6 characters) blinks at the lower part of the display portion 3 (FIG. 3, part (e)). It is also possible to display a character which is currently selected in a different color rather than by blinking.

If the "3" key is pushed once in this situation, a character to be blinked is shifted to right next (FIG. 3, part (f)), moreover, if the "3" key is pushed twice, a character to be blinked is shifted right by two characters (FIG. 3, part (g)). In the same manner, if the "3" key is pushed, a character to be blinked shifts at the same time as it is pushed (FIG. 3, part (h)), and if the "3" key is pushed in a situation where the last character (the rightmost character) is blinking, the first character (the leftmost character) start blinking (FIG. 3, part (e)).

If the timeout occurs or the determination key is pushed in this situation in which a character of the second phase is blinking, an input character is determined (FIG. 3, part (i)) and the cursor moves to prepare for a new character input. And, if another key to which a character is assigned (the "2" key) in a situation where one of character of the second phase is blinking, an indeterminate character which is assigned for the second phase is determined as an input character and after moving the cursor next to the determined character, a character which is assigned to the "2" key is displayed on the cursor to display on the display portion 3.

As described above, in terms of character structures to which tone signs are appended, such as Vietnamese, it becomes possible to significantly reduce the number of times keys need to be pushed to select a desired character, due to the two-phase character selection procedure. In particular, it is possible to input characters to which tone signs are appended by operating the same key, therefore, movement of the fingers for character input can be reduced to a minimum. Moreover, when selecting a character from the second phase, all candidate characters of the first phase and the second phase are displayed, and a character that is available for selection for input from the second phase blinks in addition to displaying a cursor for the first phase, therefore, it becomes possible to recognize the input phase easily as well as to recognize a character that is selected currently, thus increasing the operability.

Moreover, the determination of an input character is processed automatically when the timeout has occurred, therefore, it becomes possible to select a vowel character to which a tone sign is appended using a single key, thus simplifying the operation. Moreover, two-phase character selection is applied in which the second phase characters are modified characters of the first phase characters such as derived vowel characters of the vowel characters shown as an example, therefore, it becomes possible for users to find the key to which a character of the second phase is assigned even though only characters of the first phase are indicated on the surface of the key buttons.

Characters which are defined in the second phase of the key assign table 41 may include, in addition to characters to which tone signs are appended as shown in FIG. 4, characters of phonograms to which a dull sound mark or pronunciation marks are appended, such as dull sounds or "pa", "pi", "pu", "pe" and "po" in Japanese, umlaut in German or grave accent, acute accent or cedilla in French.

It is also preferable that a predetermined time which is used to detect a timeout is specified by the user. For example, it is possible to input the time span according to the request of the user and store the value input in the memory 4, and to read the stored value of the time span upon starting an input operation of characters and detect the timeout according to the value read. By providing such a structure, the user can modify the setting for better use due to that the user can change the time span of the timeout according to his or her preference.

The mobile terminal apparatus of the present invention may include a cellular phone using mobile communication, a personal digital assistant (PDA) providing a mobile communication function, and mobile terminals.

The character input process can be achieved by storing a computer program for realizing the processing function of FIG. 2 in a computer readable medium, and, with the computer system, reading and executing the program stored in the medium. Here, "computer system" includes the OS and hardware such as peripheral devices and so on. Moreover, the "computer system" includes the environment of providing home pages (or, the environment of showing home pages). Moreover, a "computer readable medium" is a portable medium such as a flexible disk, a magneto-optical disk, ROM (Read Only Memory), CD-ROM (Compact Disk ROM) and so on, and a storage device such as a hard disk which is built in a computer. Moreover, a "computer readable medium" may include a volatile memory (RAM: Random Access Memory) storing a program for a certain time period, which is installed inside of the computer system that works as a server or a client when a program is delivered via a network such as the internet or via a communication line such as a phone line.

Moreover, the above described program may be set from the computer system which stores the program in the storage devices and so on, via the transmission medium or transmission wave included in the transmission medium, to other computer systems. In this application, "the transmission medium" which transmits the program is a medium capable of transmitting information such as a network (communication network) like the internet and so on, or communication channels (communication lines). The above described program may be a program that partially achieves the above described functions. Moreover, the above described program may be a program that can achieve the above described functions in combination with a program that is already stored in the computer system, that is to say, a differential file (differential program).

According to the present invention, effects can be obtained such as effective character input and improved usability since, for character input in a language which has many kinds of characters, two phase selection is applied to minimize the movement of fingers for selecting characters and to decrease the number of times characters need to be input.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A mobile terminal apparatus which displays characters on a display unit comprising:
   a plurality of keys to each of which a plurality of characters are assigned; and
   a control unit which operates to request the display unit to display a character corresponding to one of the plurality of keys which is operated; wherein
   the control unit operates in a manner in which the control unit
   when a first key is pushed as first operation, requests a character be displayed which is assigned to the first key,
   when the same key as the first key is continuously operated as second operation from the first operation in predetermined time, requests a next character be displayed which is assigned to the first key instead of the character which is currently being displayed,
   when a time span between the first and the second operation exceeds the predetermined time and the currently displayed character is a special character that has a variation, requests that the displayed character be changed to the variation, and
   when the time span exceeds the predetermined time and the currently displayed character is not the special character, requests a new character be displayed next to the currently displayed character.

2. A mobile terminal apparatus according to claim 1, wherein the control unit,
   when a second key is operated continuously after the first operation, requests a character be displayed which is assigned to the second key next to the currently displayed character.

3. A mobile terminal apparatus according to claim 1, wherein a character of the variation is a character which consists of the special character and one of a tone sign, a dull sound mark, and a spelling mark.

4. A mobile terminal apparatus according to claim 1, wherein the special character is included in vowel characters of phonograms.

5. A mobile terminal apparatus according to claim 4, wherein
   the vowel characters include a derived vowel character which is a vowel character to which a sign is appended, and
   a character of the variation is the derived vowel character.

6. A mobile terminal apparatus according to claim 5, wherein when the first character is the vowel character and has the derived vowel character, the vowel character and the derived vowel character are assigned to the same first key.

7. A mobile terminal apparatus according to claim 1, wherein the predetermined time is variable.

8. A character input method for a mobile terminal apparatus which displays characters on a display unit, which includes a plurality of keys to each of which a plurality of characters are assigned, and which operates to request the display unit to display a character corresponding to one of the plurality of keys which is operated, the character input method comprising:

displaying a character which is assigned to a first key when the first key is pushed as first operation, displaying a next character which is assigned to the first key instead of the character which is currently being displayed when the same key as the first key is continuously operated as second operation from the first operation in predetermined time, changing the displayed character to a variation when a time span between the first and the second operation exceeds the predetermined time and the currently displayed character is a special character that has the variation, and displaying a new character next to the currently displayed character when the time span exceeds the predetermined time and the currently displayed character is not the special character.

9. A character input method for a mobile terminal apparatus according to claim 8, wherein displaying a new character which is assigned to a second key next to the currently displayed character when the second key is operated continuously after the first operation.

10. A character input method for a mobile terminal apparatus according to claim 8, wherein a character of the variation is a character which consists of the special character and one of a tone sign, a dull sound mark, and a spelling mark.

11. A character input method for a mobile terminal apparatus according to claim 8, wherein the special character is included in vowel characters of phonograms.

12. A character input method for a mobile terminal apparatus according to claim 11, wherein the vowel characters include a derived vowel character which is a vowel character to which a sign is appended, and a character of the variation is the derived vowel character.

13. A character input method for a mobile terminal apparatus according to claim 12, wherein when the first character is the vowel character and has the derived vowel character, the vowel character and the derived vowel character are assigned to the same first key.

14. A character input method for a mobile terminal apparatus according to claim 8, wherein the predetermined time is variable.

15. A computer readable medium encoded with computer executable instructions of a character input program included in a mobile terminal apparatus which displays characters on a display unit and includes a plurality of keys to each of which a plurality of characters are assigned, and which operates to request the display unit to display a character corresponding to one of the plurality of keys which is operated, the computer readable medium encoded with the computer executable instructions comprising:

first instructions for, when a first key is pushed as a first operation, displaying a character which is assigned to the first key, second instructions for, when the same key as the first key is continuously operated as second operation from the first operation in predetermined time, displaying a next character which is assigned to the first key instead of the character which is currently being displayed, third instructions for, when a time span between the first and the second operation exceeds the predetermined time and the currently displayed character is a special character that has a variation, changing the displayed character to the variation, and fourth instructions for, when the time span exceeds the predetermined time and the currently displayed character is not the special character, displaying a new character next to the currently displayed character.

16. A mobile terminal apparatus which displays characters on a display unit comprising:

a display unit for displaying characters;

an operation portion comprising a plurality of keys to which a plurality of characters are assigned; and a control unit which conducts a control operation in which, when a first key included in the plurality of the keys is successively pressed, the plurality of characters assigned to the first key are displayed as indeterminate characters in a predetermined order one after another on the display unit, and which conducts a control operation in which, when a predetermined command is input via the operation portion while the indeterminate character is displayed, the indeterminate character is recognized as a determined character, wherein the control unit operates in a manner in which when the first key included in the multiple keys is pressed as a first operation, the control unit starts monitoring whether or not a predetermined time is passed and requests a first character be displayed which is a character included in the multiple characters that are assigned to the first key, when the first key is successively pressed in the predetermined time, instead of the first character, the control unit requests a second character be displayed as an indeterminate character that is assigned to the first key next to the first character in the predetermined order, when the first key is successively pressed after the predetermined time, the control unit determines whether or not the first character is a special character that is another variation character obtained by adding at least one of a tone sign, dull sound mark, and spelling mark to the first character, when the first key is successively pressed after the predetermined time and when the first character is the special character, the first character which is currently displayed as an indeterminate character is changed to a third character that is an indeterminate character obtained by adding at least one of a tone sign, dull sound mark, and spelling mark to the first character, and when the first key is successively pressed after the predetermined time and when the first character is not the special character, the first character which is currently displayed is determined and a first character which is assigned to the first key is displayed next to the currently displayed first character.

* * * * *